United States Patent
Asada et al.

(10) Patent No.: US 9,381,642 B2
(45) Date of Patent: Jul. 5, 2016

(54) WEARABLE ROBOT ASSISTING MANUAL TASKS

(71) Applicant: Massachusetts Institute of Technology, Cambridge, MA (US)

(72) Inventors: Haruhiko Harry Asada, Cambridge, MA (US); Baldin Adolfo Llorens-Bonilla, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 3 days.

(21) Appl. No.: 14/595,873

(22) Filed: Jan. 13, 2015

(65) Prior Publication Data

US 2015/0217444 A1    Aug. 6, 2015

Related U.S. Application Data

(60) Provisional application No. 61/926,587, filed on Jan. 13, 2014.

(51) Int. Cl.
| | |
|---|---|
| G05B 15/00 | (2006.01) |
| G05B 19/00 | (2006.01) |
| B25J 9/00 | (2006.01) |
| B25J 5/00 | (2006.01) |
| B25J 9/16 | (2006.01) |

(Continued)

(52) U.S. Cl.
CPC ......... B25J 9/0006 (2013.01); B25J 5/00 (2013.01); B25J 9/0084 (2013.01); B25J 9/1682 (2013.01); B25J 9/1694 (2013.01); F16M 13/04 (2013.01); G05B 19/423 (2013.01)

(58) Field of Classification Search
USPC ........... 700/245, 258; 600/587, 595; 414/2, 7, 414/11; 254/133 R
See application file for complete search history.

(56) References Cited

U.S. PATENT DOCUMENTS

| | | | | |
|---|---|---|---|---|
| 5,624,398 A | * | 4/1997 | Smith | .............. B25J 15/02 604/95.01 |
| 5,703,303 A | * | 12/1997 | Stewart | .............. G01M 99/001 73/7 |

(Continued)

FOREIGN PATENT DOCUMENTS

| | | |
|---|---|---|
| WO | WO 2012/154580 A1 | 11/2012 |
| WO | WO 2015/106278 A2 | 7/2015 |

OTHER PUBLICATIONS

Baldin Llorens-Bonilla et al., "Demonstration-Based Control of Supernumerary Robotic Limbs," Intelligent Robots and Systems (IROS), 2012 IEEE/RSJ International Conference on, IEEE, pp. 3936-3942, Oct. 2012.

(Continued)

*Primary Examiner* — Ronnie Mancho
(74) *Attorney, Agent, or Firm* — Hamilton, Brook, Smith & Reynolds, P.C.

(57) ABSTRACT

A wearable robotic system assists a wearer in performing manual tasks. One or more robotic arms are mounted to a wearer, and an sensor monitors the orientation(s) (e.g., position and movement) of the wearer's upper body and one or both arms. A controller detects a task being performed by the wearer based on the orientation(s) as indicated by the orientation sensors. In response, the controller causes the robotic arm to perform an action independent of the orientation(s) of the wearer's arms and complementary to the task, thereby aiding the wearer to accomplish the detected task.

24 Claims, 13 Drawing Sheets

(51) Int. Cl.
*F16M 13/04* (2006.01)
*G05B 19/423* (2006.01)

(56) References Cited

U.S. PATENT DOCUMENTS

| | | | | | |
|---|---|---|---|---|---|
| 5,845,540 | A | * | 12/1998 | Rosheim | B25J 3/04 414/4 |
| 5,967,580 | A | * | 10/1999 | Rosheim | B25J 3/04 294/106 |
| 6,301,526 | B1 | * | 10/2001 | Kim | B25J 9/0006 600/1 |
| 6,379,393 | B1 | * | 4/2002 | Mavroidis | A61F 2/54 623/25 |
| 6,507,163 | B1 | * | 1/2003 | Allen | B25J 9/162 14/78 |
| 7,070,571 | B2 | * | 7/2006 | Kramer | A61B 5/1071 600/595 |
| 7,410,338 | B2 | * | 8/2008 | Schiele | A61H 1/0274 414/4 |
| 7,413,554 | B2 | * | 8/2008 | Kobayashi | A61F 5/0102 602/13 |
| 7,862,524 | B2 | * | 1/2011 | Carignan | A61H 1/0281 601/33 |
| 8,057,410 | B2 | * | 11/2011 | Angold | A61H 1/0281 601/33 |
| 8,083,694 | B2 | * | 12/2011 | Peles | A61H 1/0277 601/33 |
| 8,409,118 | B2 | * | 4/2013 | Agrawal | A61H 1/0237 601/23 |
| 8,414,658 | B2 | * | 4/2013 | Johnson | A61F 2/54 623/32 |
| 8,558,204 | B2 | * | 10/2013 | Rees | A61B 6/107 250/516.1 |
| 8,731,716 | B2 | * | 5/2014 | Jacobsen | A61F 2/68 700/245 |
| 8,849,457 | B2 | * | 9/2014 | Jacobsen | A61H 3/008 623/24 |
| 8,909,370 | B2 | * | 12/2014 | Stiehl | B25J 9/1671 700/245 |
| 8,968,220 | B2 | * | 3/2015 | Han | A61H 1/0274 601/23 |
| 2013/0094847 | A1 | | 4/2013 | Di Leo | |

OTHER PUBLICATIONS

Parietti Federico et al, "Dynamic Analysis and State Estimation for Wearable Robotic Limbs Subject to Human-Induced Disturbances," 2013 IEEE International Conference on Robotics and Automation (ICRA); pp. 3880-3887, May 2013.

Baldin Llorens-Bonilla et al., "A robot on the soulder: Coordinated Human-Wearable Robot Control Using Coloured Petri Nets and Partial Least Squares Predictions," 2014 IEEE International Conference on Robotics and Automation (ICRA); pp. 119-125, May 2014.

Notification of Transmittal of the International Search Report and the Written Opinion of the International Searching Authority for Int'l Application No. PCT/US2015/011231, "Wearable Robot Assisting Manual Tasks," date mailed: Aug. 7, 2015.

* cited by examiner

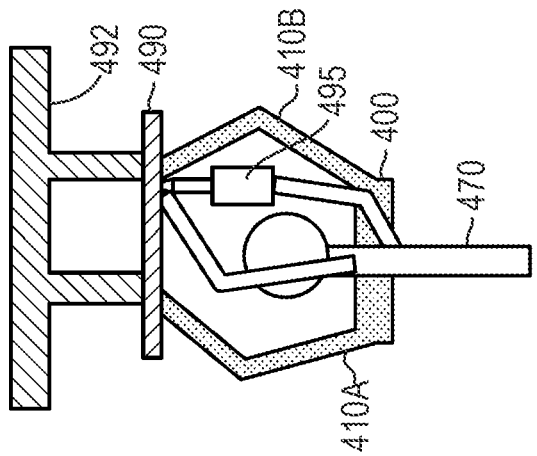
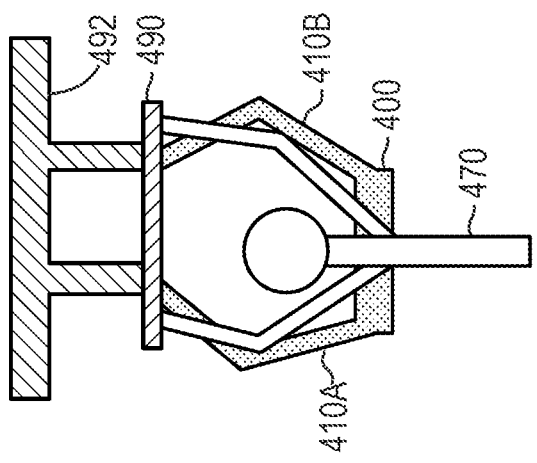
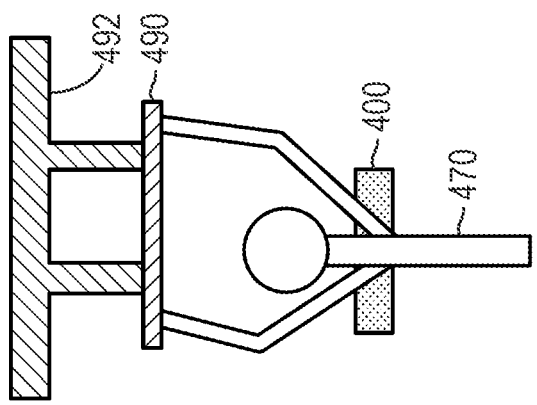

WEARABLE ROBOT ASSISTING MANUAL TASKS

RELATED APPLICATION

This application claims the benefit of U.S. Provisional Application No. 61/926,587, filed on Jan. 13, 2014. The entire teachings of the above application are incorporated herein by reference.

BACKGROUND

Robotic systems have been applied in a number of industries to replace manual labor, or to assist a human operator in performing manual tasks. Typically, such robotics may perform a preprogrammed operation, such as assembling an item in an assembly line or other manufacturing process. Other robots, such as exoskeletons, have been implemented to augment the actions of a human operator by mimicking the operator's movements. Depending on their application, robotic systems can operate autonomously or under a degree of human control to complete a given action.

SUMMARY

Embodiments of the present invention provide a robotic system including a robotic arm mounted to a wearer, proximate to a shoulder of the wearer, to assist the wearer in performing manual tasks. The system further includes one or more sensors configured to sense motion of the wearer's upper body and one or both arms. A controller operates to detect a task being performed by the wearer based on the motion as indicated by the sensor(s). In response, the controller causes the robotic arm to perform an action independent of the motion and complementary to the task, thereby aiding the wearer to accomplish the detected task.

Further embodiments of the present invention provide a robotic system including a robotic arm mounted to a wearer to assist the wearer in performing manual tasks. The system further includes one or more sensors configured to sense a state (e.g., position, motion, or combination thereof) of the wearer's upper body and one or both arms. A controller operates to detect a task being performed by the wearer based on the state as indicated by the sensor(s). In response, the controller causes the robotic arm to perform an action independent of the state and complementary to the task, thereby aiding the wearer to accomplish the detected task.

In further embodiments, the robotic arm may be mounted above the wearer's shoulders or another location remote to the wearer's range of motion. The controller may be further configured to cause the robotic arm to compensate for a change in the state as a function of at least one maximum correlation variable between the robotic arm and the change in the state. The action taken by the robotic arm may be a given sequence of movements.

In still further embodiments, the controller may be configured to perform the action based on prediction information, where the prediction information indicates an anticipated movement of the wearer based on the state of the wearer's upper body, one or both arms, or combination thereof. The prediction information may also indicate a desired action of the robotic arm predicted in response to the wearer's motion and anticipated task. The controller may further update the prediction information to a database based on backdriven movement (e.g., human-manipulated movement) of the robotic arm. The controller may also generate the prediction information based on recorded movement of the robotic arm and recorded change in state (e.g., movement) of the wearer's upper body and the wearer's arm. Such a recording of motion is performed by measuring the movements of both wearer and another user who operates the robot while the wearer performs the task during a recorded training session. If the robot is backdriveable, the user can grab the robot arm and navigate it through a trajectory to demonstrate how to execute a task together with the wearer. The controller may selectively enable a "training mode," whereby the robotic arm is enabled to be backdriven, and the backdriven movement, along with the wearer's state(s), are recorded.

In yet further embodiments, the robotic arm may include one or more sensors at an end or another location of the arm, the sensors providing feedback to the controller to ensure proper movement and orientation of the robotic arm. Based on a feedback signal from the sensor, the controller may cause the robotic arm to implement one or both of a given position and a given force. The controller may determine a movement of the robotic arm based on a partial least squares regression based on the states of the wearer's upper body and/or wearer's arm(s) and the robotic arm.

In yet still further embodiments, the system may include two or more robotic arms (e.g., second and third robotic arms) mounted to the wearer and configured to perform an action independent of the state(s) and complementary to the task. The system may also include a mount supporting the robotic arms above the wearer's shoulders. The sensor may further include a plurality of sensors mounted to the wearer's upper body, arms, and other locations to determine the wearer's state, which may include position, movement, or combination thereof. The sensor may also include an imaging device to capture an image of the wearer, whereby the controller may determine the state(s) by processing the image.

Further embodiments of the invention provide a method of operating a robotic system. A robotic arm is first enabled to be backdriven by a user, where the robotic arm is mounted to a wearer distinct from the user. The user may then manipulate the robotic arm to perform an action concurrently with the wearer's performing a task. Representations of the backdriven movement of the robotic arm by the user are recorded. Further, representations of the concurrent movement of the wearer are also recorded. A movement instruction for the robotic arm is generated based on the recorded backdriven movement and recorded movement of the wearer. During subsequent operation of the robotic system, the movement instruction may be implemented to control the robotic arm dependent on the detected movement of the wearer.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A-C illustrate an example process of manual task and complementary action performed by a robotic system.

DETAILED DESCRIPTION

Figure 1A:
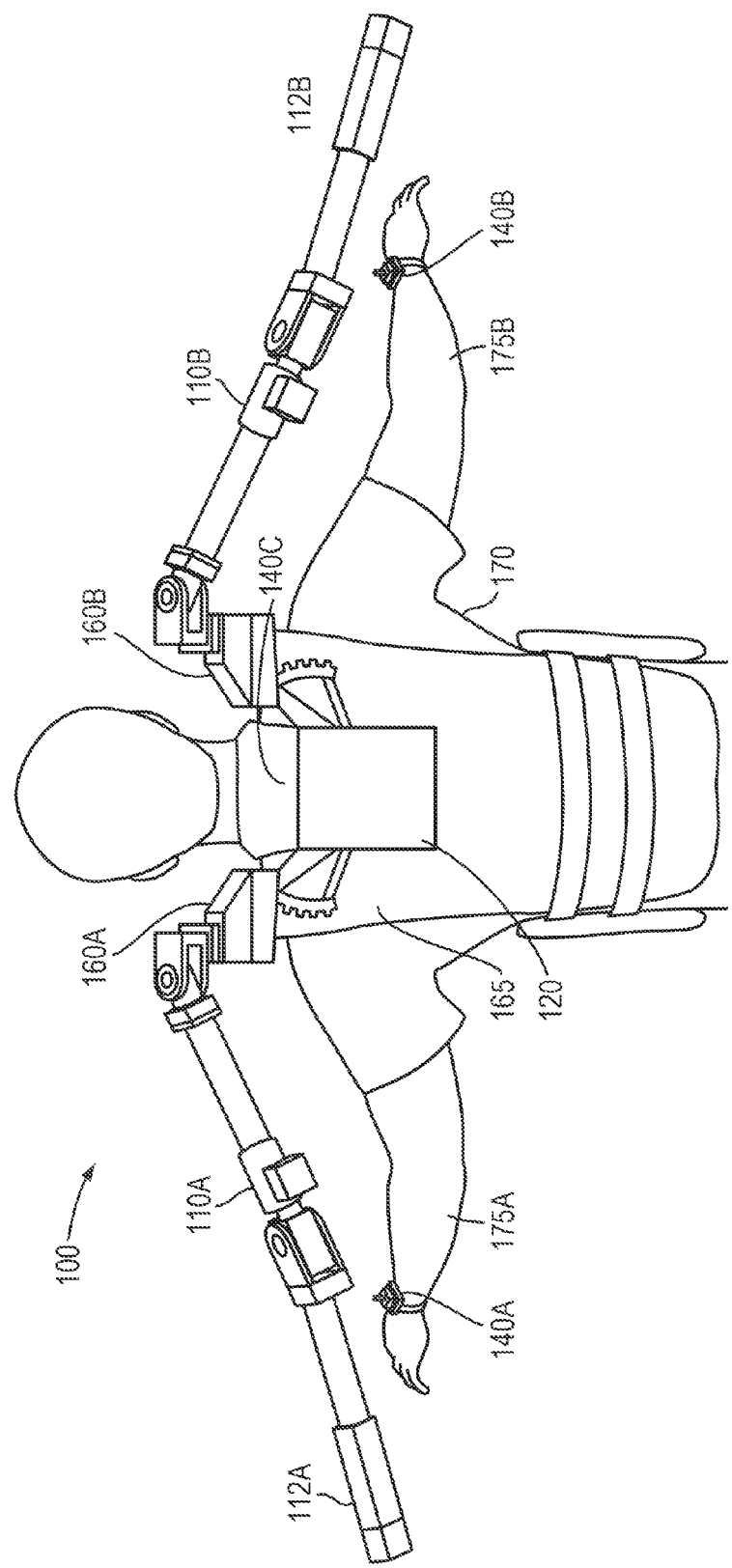
FIG. 1A illustrates a wearable, shoulder-mounted robotic system in one embodiment.

A description of example embodiments follows.

Many manual tasks carried out by a human worker would benefit from having an extra hand to hold an object temporarily while both of the worker's hands are busy. When installing a lighting fixture in a ceiling, for example, it may be helpful (or necessary) to recruit a second worker to assist in holding the fixture while the first worker secures it with screws using a screwdriver. Such tasks in the workspace above the worker's head are laborious for the worker relative to the workspace between the shoulder and the waist. Installation, inspection, and repair of ceiling panels, cable wires, air ducts, and lighting fixtures are just a few examples of tasks that are ergonomically challenging for the worker. The worker's arm strength as well as precision and dexterity of hand performance deteriorate sharply as the work area is elevated to the overhead space. Prolonged work in such an inefficient and uncomfortable posture often leads to injuries at the neck, arms, and the back.

Example embodiments of the present invention provide a wearable robotic system that is secured to the shoulder of a human worker (also referred to as the "wearer") and that assists the worker in executing a task. The robotic system can provide one or more supernumerary robotic limbs (SRLs) to assist the wearer in completing a number of tasks, and particularly overhead tasks. With the SRLs coordinated with the wearer's arms and performing actions complementary to the task, the wearer can perform the tasks in an effective and productive manner with a reduced physical effort. One of the many ways the robotic system can aid the wearer is by holding a ceiling panel while the wearer is installing the ceiling panel overhead. This allows the wearer to use both of his or her hands to pick up a screw and a powered screwdriver in order to secure the ceiling panel to a ceiling. Tasks such as this one usually require two workers to perform the task, but the SRL on the shoulder allows a single worker to execute the task individually.

Prior applications of robotic limbs have included prostheses for amputees, as well as exoskeletons for extending the strength of human limbs. Embodiments of the robotic system described herein provide features distinct from such applications. Unlike prostheses, SRLs provide the wearer with extra limbs rather than replacing lost limbs. Unlike exoskeletons, where powered joints are attached to the corresponding joints of the wearer, SRLs may move independently from the wearer's limbs while performing actions complementary to the task being completed by the wearer. To enable such actions by the SRLs, the robotic system communicates and coordinates with the wearer. In one embodiment, the robotic system determines the intentions of the wearer and plans complementary actions accordingly.

Existing human-robot communication techniques have primarily focused on a human-robot system where the robot is physically separated from the human. In contrast, a robotic system implementing SRLs is attached to the human body, resulting in a substantially different communication channel. For example, the reaction force and moment induced by the robot's motion, as well as the forces that the environment exerts on the robot, are transmitted to the human body as haptic feedback. In the example of installing a ceiling panel described above, as the robot holds the ceiling panel and presses it against the ceiling frame, the wearer feels the reaction force on his or her shoulders. The wearer can use this haptic feedback as a measure of how securely the ceiling panel is being held and to improve his or her coordination with the robot.

Implementing a robotic system with SRLs working in close proximity to a human wearer, both pairs of human and robotic arms, in such an embodiment, concurrently share the same workspace. One technical challenge of this implementation is the coordination and synchronization among the four arms, which is useful for successful and efficient implementation of the SRL. It is further useful to employ an effective modeling method for representing a collaborative task process, where multiple arms and hands are working concurrently.

Embodiments of the present invention provide a wearable robotic system having supernumerary robotic limbs and a controller that provides proper coordination and communication between the robot and the wearer. In example embodiments, coordination may be planned using Coloured Petri Nets (CPN), also known as a place/transition net, and communication may implement partial least squares (PLSs)-based predictions. A Petri net may provide for representing distributed, concurrent, and discrete event processes. The tasks performed by four arms, including two human arms and two SRLs robot arms, can be processed as a distributed system comprising both human and robot control systems. It may also be considered a concurrent event system, as the four arms make state transitions in parallel. However, describing the discrete nature of state transitions alone cannot capture dynamics of the system to perform real-time coordination control. To address this issue, local dynamic controllers may be configured to identify a few selected transitions, where the robot takes proactive and preemptive actions by observing the wearer and the task process status. As a result, the level of human-robot coordination can be raised from static step-by-step transitions to dynamic, prediction-based transitions.

FIG. 1A illustrates a wearable, shoulder-mounted robotic system 100 in one embodiment. The system 100 may be fitted to a wearer 170 via a harness 165. A controller 120 and shoulder mounts 160A-B may be coupled to the harness 165. Each of the shoulder mounts 160A-B, in turn, is coupled to and supports a respective robotic arm 110A-B. The shoulder mounts 160A-B may support the robotic arms 110A-B in a position sufficiently above the shoulders of the wearer 170 so as not to interfere with the range of motion of the wearer's upper body and arms 175A-B. Further, the shoulder mounts 160A-B may be configured with the harness 165 to form a hinged vest, which is simple for the wearer 170 to put on, as well as provides a secure fit to the bottom of the wearer's neck.

A number of sensors 140A-C may be coupled or proximate to the wearer 170. The sensors 140A-C may be implemented as inertial measurement units (IMUs), and may include one or more sensor devices (e.g., gyroscopes, accelerometers, IR sensors, image processors) configured to sense states of the wearer 170, such as position and/or motion (e.g., acceleration and/or velocity) of the wearer 170. In alternative embodiments, the sensors 140A-C may include sensors remote from the wearer 170, such as an image sensor configured to capture images of the wearer 170 and/or the robotic arms 110A-B at a distance from the wearer 170.

The controller 120 may be communicatively coupled to the robotic arms 110A-B and sensors 140A-C via wired or wireless channels. The controller 170 monitors the motion and/or orientation (also referred to as "state") of the wearer 170 via motion and/or orientation data (e.g., accelerometer gyroscope, and/or image data) provided by the sensors 140A-C. The controller 120 may further communicate with the robotic arms 110A-B to control movement of the robotic arms, as well as to receive position, motion, and feedback data from the robotic arms 110A-B. The robotic arms 110A-B may also provide sensor data from one or more sensors (not shown) located, for example, at a respective end 112A-B of each of the robotic arms 110A-B. In alternative embodiments, the controller 120 may be located (in part or in entirety) remotely from the remainder of the system 100. For example, the controller 120 may be implemented in a computer workstation or other computing device that is communicatively coupled to the sensors 140A-C and robotic arms 110A-B via a wired or wireless communications network (not shown).

The robotic system 100 may operate to sense the position and motion of the wearer 170, via the sensors 140A-C, and monitor the task status using sensors 140A-C to determine which step in a task process (represented, e.g., by a Petri Net model) the robot-wearer system is currently at. The controller 120 then causes the desired position of the robot arms 110A-B in accordance with the wearer's motion and the task status. The action taken by the robotic arms 110A-B may be a given sequence of movements, which may vary dependent upon the wearer's motion and/or feedback signals provided by the robotic arms 110A-B. The controller 120 may determine the task and, in turn, the action to be performed by the robotic arms 110A-B, based on prediction information that indicates an anticipated movement of the wearer 170 based on the movement of the wearer's upper body, one or both arms 175A-B, or combination thereof. Such prediction information can be generated based on previous "training" operations, where backdriven movement of the robotic arms 110A-B (e.g., by a human assistant) and the wearer's movements (as represented by the sensors 140A-C) are recorded and processed to generate movement instructions for the robotic arms 110A-B for use during real-time operations. Such prediction information and movement instructions may be stored to a data store (described below with reference to FIG. 2) communicatively coupled to the controller 120.

Figure 1B:
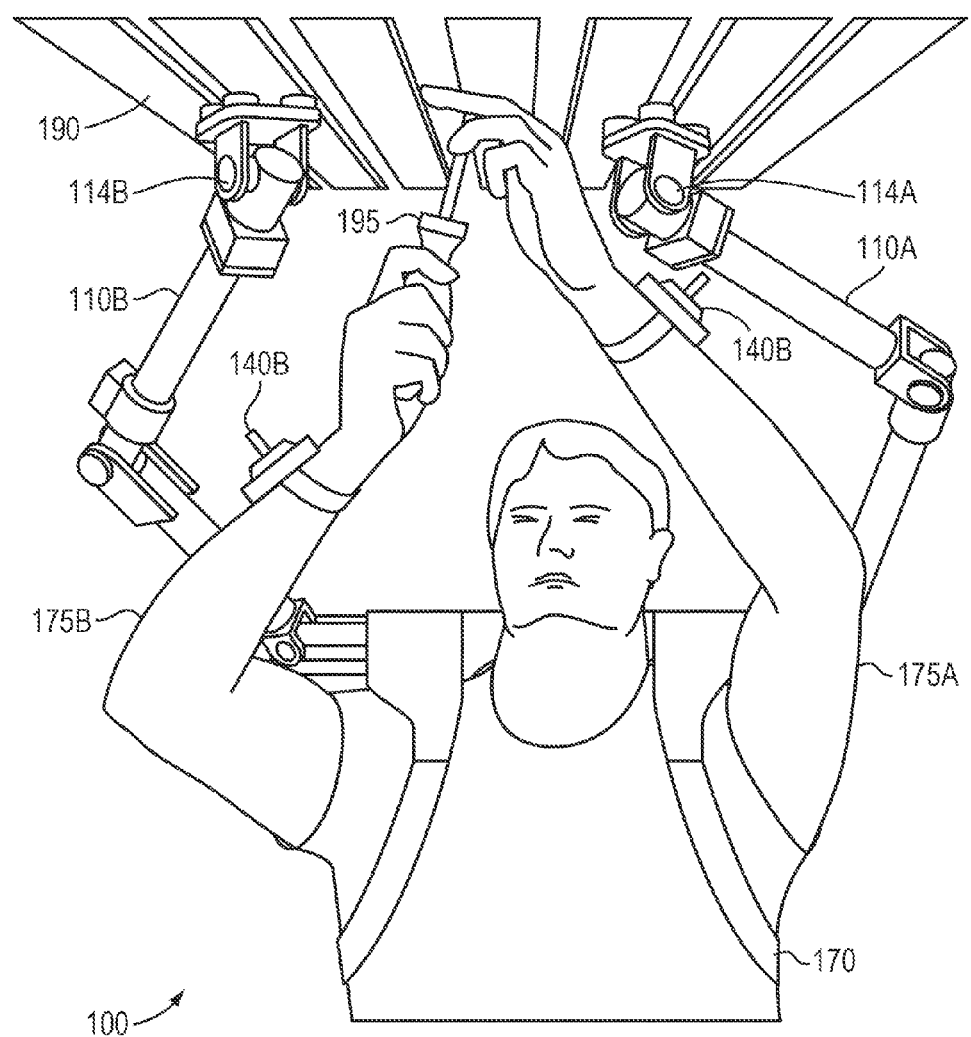
FIG. 1B illustrates the robotic system of FIG. 1A during a manual task undertaken by a wearer.

FIG. 1B illustrates the robotic system 100 during assistance of a manual task undertaken by a wearer 170. Specifically, the wearer 170 is installing a ceiling panel 190 to a ceiling above the wearer's head. In order to assist in this task, the controller 120 senses the motion of the wearer 170, via sensors 140A-B near the wearer's wrists and another sensor 140C (shown in FIG. 1A) at or near the back of the wearer's neck, to determine that the wearer is intending to perform the task of installing the ceiling panel 190. In response to this detection, the controller 120 causes the robotic arms 110A-B to position themselves to support the ceiling panel 190 in place once positioned against the ceiling panel frame (hidden by the panel) by the wearer 170. The robotic arms 110A-B may be outfitted with respective holding tools 114A-B configured to contact and apply sufficient force to the ceiling panel 190 to maintain the ceiling panel 190 in place during the installation. Once the robotic arms 110A-B have positioned themselves to support the ceiling panel 190, the wearer 170 may free his or her arms 175A-B from supporting the ceiling panel 190, and instead use a screwdriver 195 or other tool to complete the installation of the ceiling panel 190.

Figure 1C:
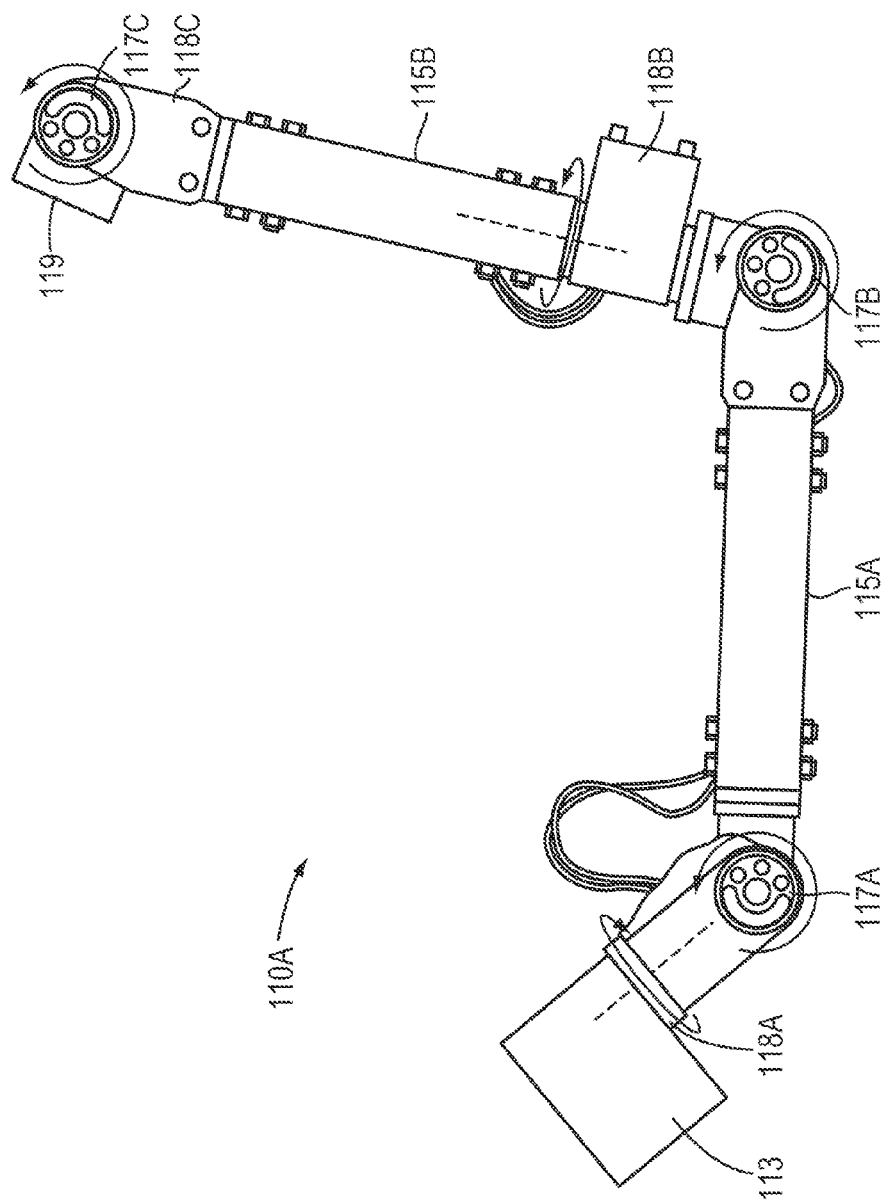
FIG. 1C illustrates a robotic arm in one embodiment.

FIG. 1C illustrates a robotic arm 110A, one or more of which may be implemented in the robotic system 100 described above. The robotic arm 110A includes, at one end, a mounting feature 113 for coupling the robotic arm 110A to a mount such as the shoulder mounts 160A-B described above. An opposite end of the robotic arm 110A includes a tool mount 119, which may be coupled to a number of different tools such as the holding tools 114A-B described above. Other tools, including manual and powered tools (e.g., gripper, pliers, drill) may be implemented as required in a given application. The tool mount 119 may include one or more sensors to provide feedback signals for monitoring the state of a tool, such the spindle speed and torque of a powered screwdriver.

The length of the robotic arm 110A includes two arm segments 115A-B coupled to three rotatable joints 117A-C, each of which are actuated by respective servomotors 118A-C. The servomotors may also actuate independent axial rotation of the arm segments 115A-B, as well as the orientation and operation of a tool coupled to the tool mount 119. As a result, the robotic arm 110A may be actuated with 5 degrees of freedom (i.e., rotation at each of the three joints 117A-C and axial rotation of the two arm segments 115A-B), enabling precise position control in three-dimensional space. The servomotors 118A-C enable the respective joints 117A-C to be torque-actuated, and provide position, speed, and torque information via feedback signals to a controller (e.g., controller 120). These servomotors may also be backdrivable, a feature that may be taken advantage of during a "training mode" to record data for movement instructions (described in further detail below). Through use of the servomotors 118A-C, the controller can control the robotic arm 110A over a wide range of motions and orientations. It should be understood that other actions, such as telescoping of the robotic arms, may be provided in alternative embodiments.

Figure 2:
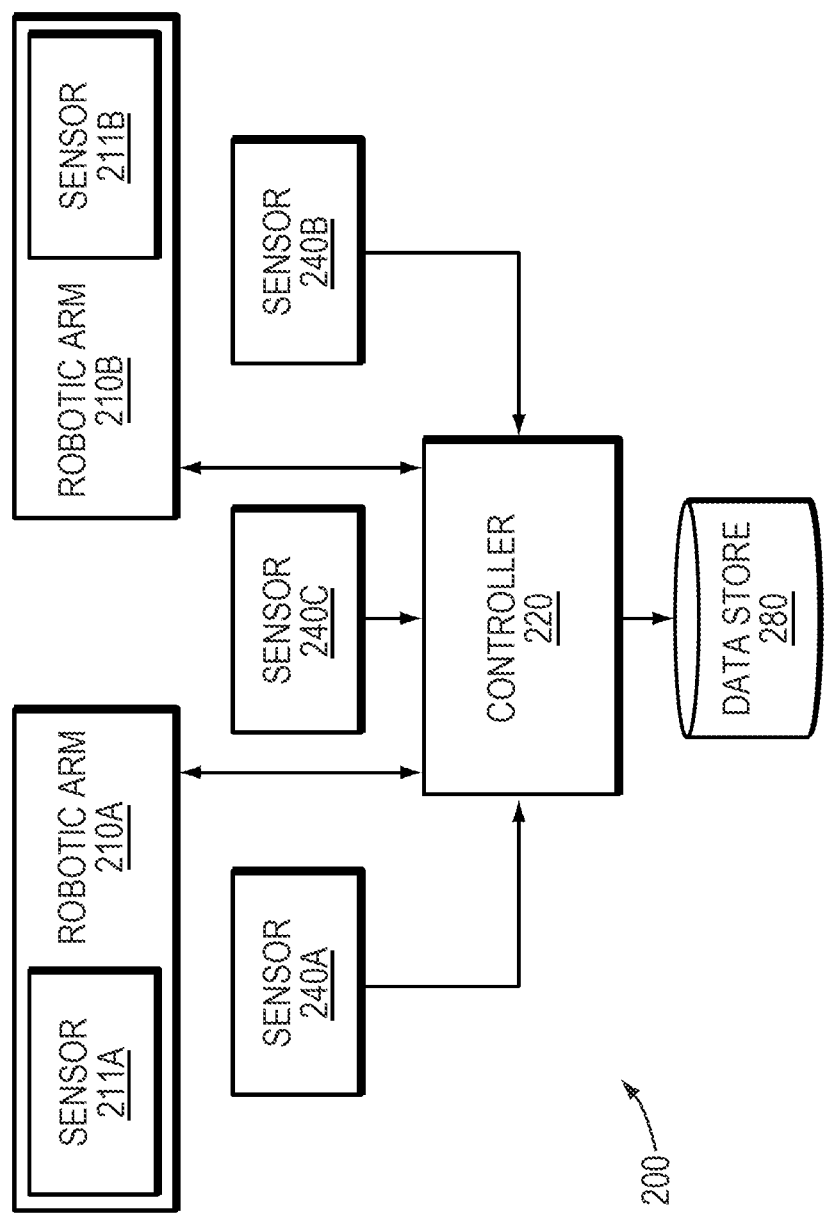
FIG. 2 is a block diagram of a robotic system in one embodiment.

FIG. 2 is a block diagram of a robotic system 200 in one embodiment. The system 200 may be configured similar to the robotic system described above with reference to FIGS. 1A-C. In particular, the system 200 includes a controller 220, sensors 240A-C, and robotic arms 210A-B. The controller 220 is communicatively coupled to the sensors 240A-C to monitor the wearer's motion(s), and is further communicatively coupled to the robotic arms 210A-B to direct movement and positioning of the robotic arms 210A-B. The controller 220 may also monitor position, velocity, acceleration, force, and torque information at each of the robotic arms 210A-B, as well as information provided by one or more sensors 211A-B at the robotic arms 210A-B (e.g., an exerted pressure, or the state of a tool coupled to the robotic arms 210A-B). Based on this feedback from the robotic arms 210A-B, the controller 220 may cause the robotic arms 210A-B to implement one or both of a given position and a given force.

In order to direct movement of the robotic arms 210A-B, the controller may further be communicatively coupled to a data store 280 (e.g., a data storage device or database), which may be local to the controller 220 or located across a wired or wireless network channel. The data store 280 may provide movement instructions for the robotic arms 210A-B based on prediction information, which can be selected from the data store 280 based on the motion(s) of the wearer as indicated by the sensors 240A-C. It should be understood that there may be as few as one sensor and also more (e.g., 4) or many more (e.g., 10) than the three indicated sensors. In the case of an optical imaging sensor, the number of sensors is not discrete by can be virtually analog in nature. The controller 220 may determine movement of the robotic arms 210A-B based on a partial least squares regression based on the motion(s), as described in further detail below.

The controller 220 may further update the prediction information to the data store 280 based on backdriven movement of the robotic arms 210A-B. The controller 220 may also generate the prediction information based on recorded backdriven movement of the robotic arm and recorded motion of the wearer's upper body and the wearer's arm. The backdriven movement may be caused by a user other than a wearer, such as an assistant who moves the robotic arms 210A-B while the wearer performs the task during a recorded training session. The controller 220 may selectively enable a "training mode," whereby the robotic arms 210A-B are enabled to be backdriven and the backdriven movement, along with representations of the wearer's motion(s), are recorded. Example processes for generating and updating prediction information and movement instructions are described in further detail below with reference to FIGS. 6 and 7.

In alternative embodiments, the system 200 may include only a single robotic arm 210A, or may include a number of additional (e.g., third and fourth) robotic arms that may be configured and controlled in a manner comparable to the robotic arms 210A-B.

Figure 3:
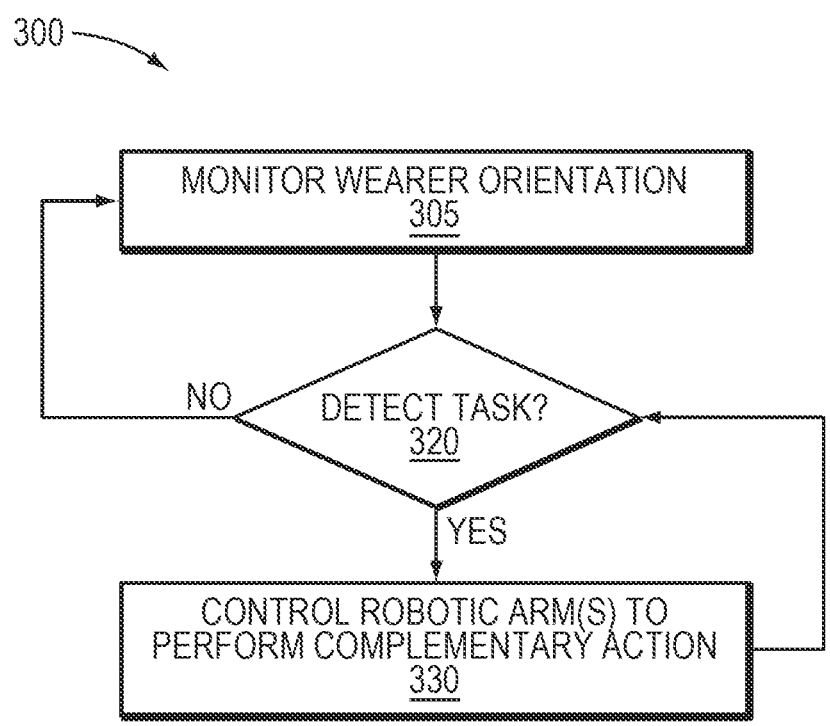
FIG. 3 is a flow diagram of a process of operating a robotic system in one embodiment.

FIG. 3 is a flow diagram of a process 300 of operating a robotic system, such as the systems 100, 200 described above with reference to FIGS. 1A-C and 2. In particular, the process 300 may be implemented by a controller (e.g., controllers 120, 220) to direct movement of one or more robotic arms (e.g., robotic arms 120A-B, 220A-B) based on feedback from one or more sensors (e.g., sensors 140A-C, 240A-C) and a given set of movement instructions and/or prediction information (provided, e.g., by the data store 280).

With reference to the system 100 of FIG. 1, the controller 120 may continuously or periodically monitor the motion and/or position of a wearer 170 via sensors 140A-C(320). Based on this information, the controller 120 may detect whether the wearer 170 is performing (or intending to perform) a recognized task (320). This determination may be made, for example, by comparing the motion(s) against a database of prediction information stored (e.g., at a data store such as the data store 280 in FIG. 2). Such comparison may include analyzing the motion(s) and prediction information using a partial least square regression (described in further detail below). If a recognized task is detected, then the controller 120 may control the robotic arms 110A-B to perform actions independent of the motion(s) and complementary to the task, thereby assisting the wearer 170 to complete the task (330).

FIGS. 4A-C illustrate an example manual task and complementary action performed by a robotic system, such as the robotic systems 100, 200 described above with reference to FIGS. 1-3. FIGS. 4A-C are described in further detail below with reference to FIG. 5.

Figure 5:
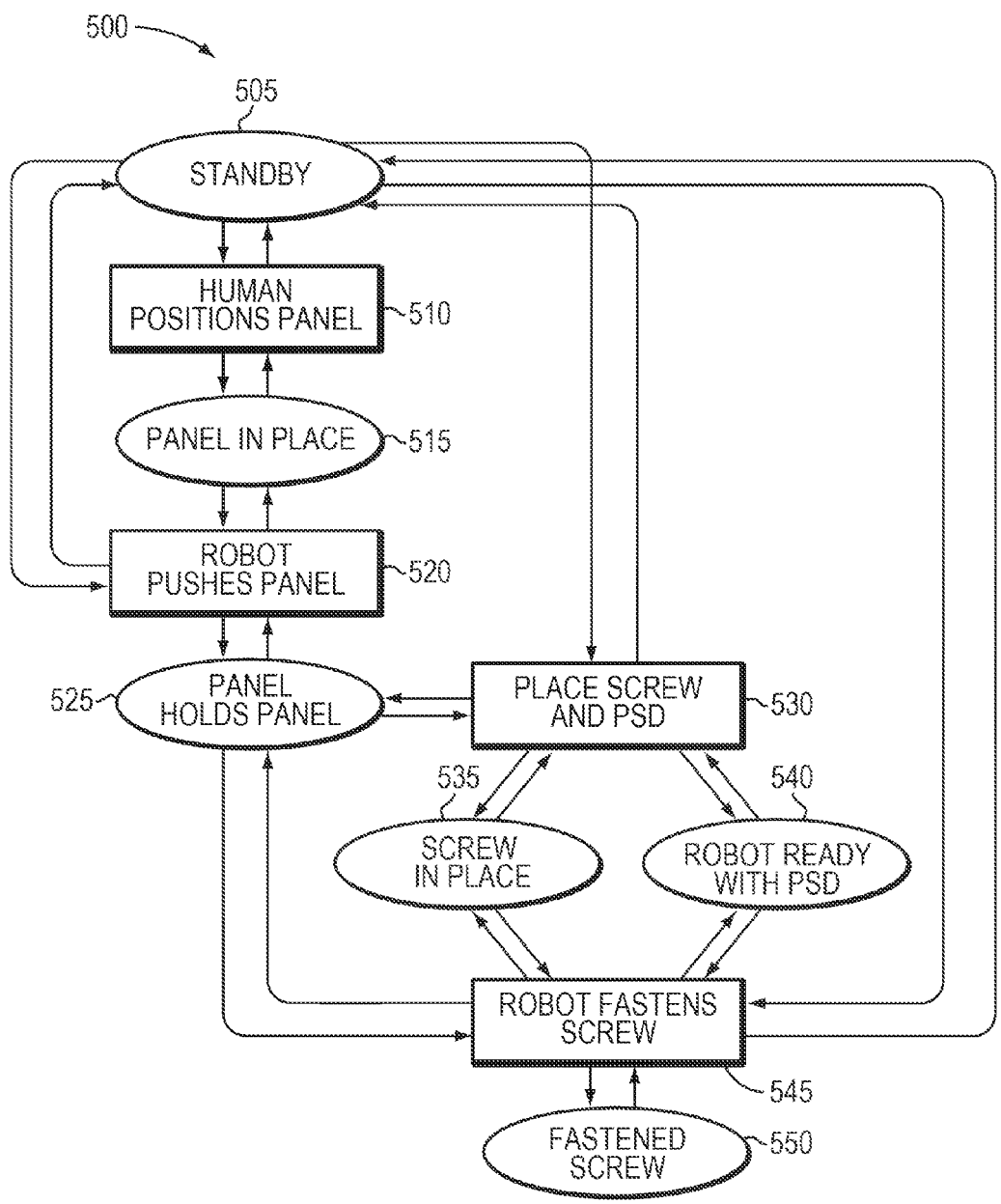
FIG. 5 is a flow diagram illustrating the process depicted in FIGS. 4A-C.

FIG. 5 is a flow diagram illustrating a process 500 as depicted in FIGS. 4A-C. As shown first in FIG. 4A, a wearer 470 wears a robotic system 400 while performing the task of installing a ceiling panel 490 to a ceiling 492. Referring to FIG. 5, the robotic system 490 exhibits a standby mode (505) where it monitors the motion(s) of the wearer 470. Upon detecting that the wearer 470 is positioning the ceiling panel 490 (510), and that the panel 490 is in place (515), as indicated by sensors, the system 400 extends robotic arms 410A-B, as shown in FIG. 4B, to push against the panel 490 (520) and holds the panel 490 stationary (525) without support from the wearer's arms.

As shown in FIG. 4C, once the robotic system 400 is holding the ceiling panel 490 in place, the wearer 470 can secure the ceiling panel 490 to the ceiling 492, using a number of screws and a power screwdriver (PSD) 495. In particular, the wearer may repeat the operations of placing a screw and the PSD 495 (530, 535) and fastening the screw (545). Such operations may be further assisted by the robotic system 400, for example by supporting, positioning and/or operating the PSD 495 (540). Once all of the screws are fastened (550) and the ceiling panel 490 is fully installed to the ceiling 492, the robotic system 400 may retract the robotic arms 410A-B from the ceiling panel 490 and return to the standby state (505).

Figure 6:
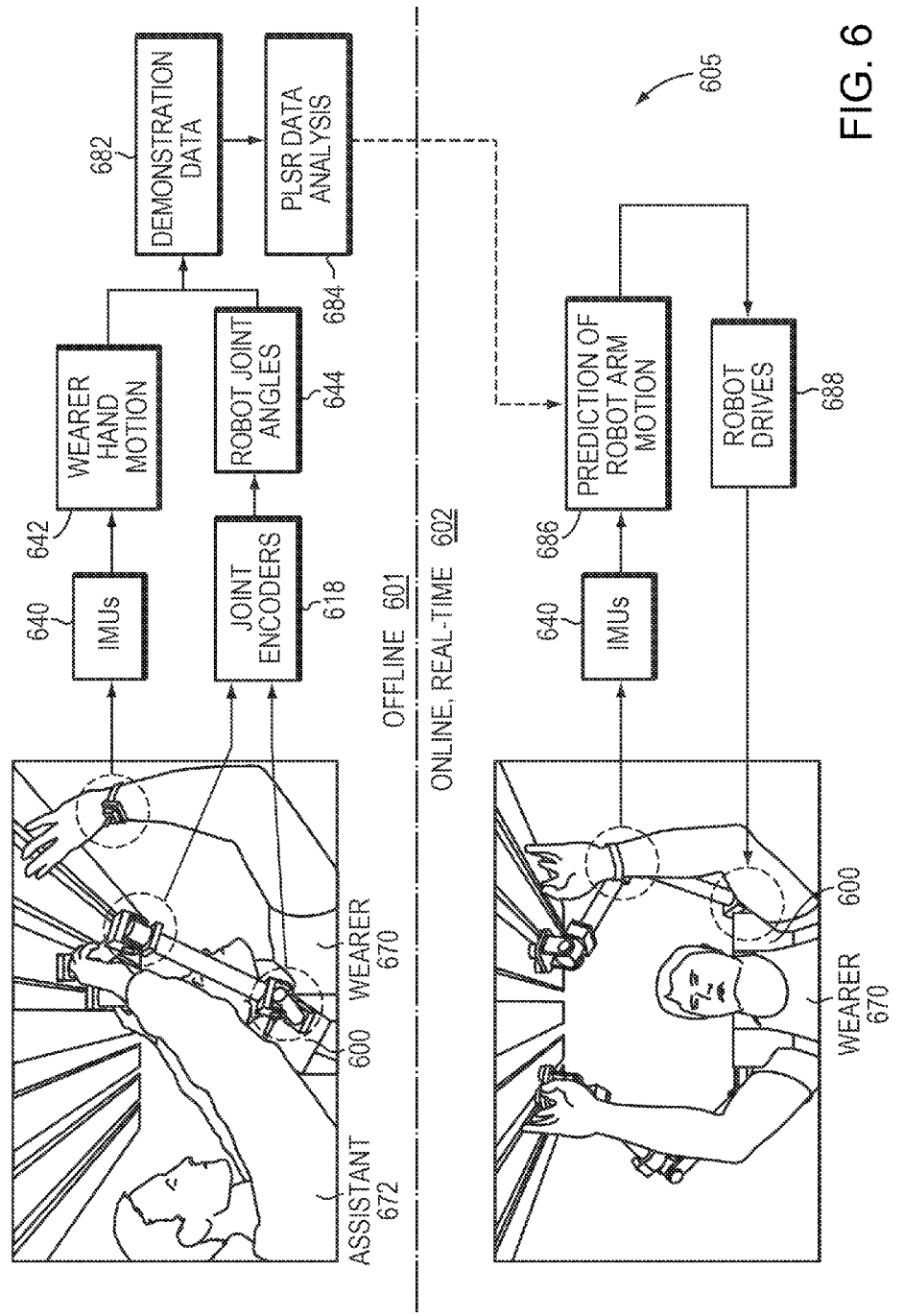
FIG. 6 is a flow diagram of a process of training a robotic system and a resulting robotic action.

FIG. 6 is a flow diagram of a process 605 of training a robotic system 600 and providing a corresponding robotic action. In an "offline" mode 601 (also referred to as a "training mode"), a wearer 670 carries out a task (e.g., installing a ceiling panel) while wearing the robotic system 600. Concurrently with the wearer 670 carrying out this task, an assistant 672 manipulates the arms of the robotic system 600 to perform an action complementary to the task (e.g., holding a ceiling panel in place). During this operation, data from the sensors (e.g., intertial measurement units (IMUs) 640) capture motion data (e.g., the wearer's hand motion 642), and the joint encoders 618 of the robotic system 600 capture position and movement data of the robotic arms (e.g., robot joint angles 644), which together provide demonstration data 682. The demonstration data 682 can be analyzed, for example via partial least squares (PLS) regression analysis (684), to provide prediction information for movement instructions. The aforementioned offline process may be repeated one or more times to develop further the PLS regression analysis (684).

During online or "real time" (602) operation, the robotic system monitors the wearer's 670 motion(s) via the sensors 640. Based on the motion(s) and the PLS regression analysis 684, the system 600 may predict a task to be performed by the wearer and the complementary actions to be performed by the robot 600 (686). Accordingly, the robotic system 600 may operate to perform the complementary action by driving the servomotors (688), thereby assisting the wearer 670 in completing the task.

Figure 7:
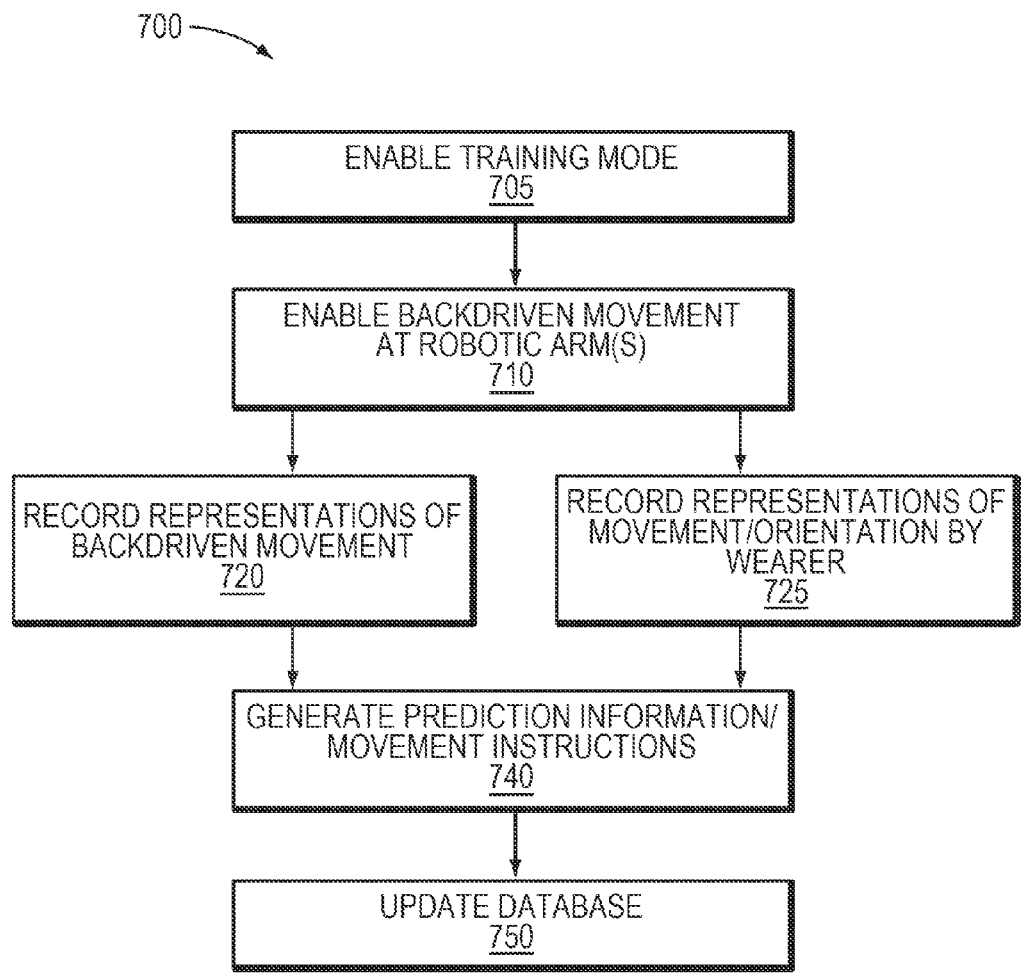
FIG. 7 is a flow diagram of a process of training a robotic system in a further embodiment.

FIG. 7 is a flow diagram of a process 700 of training a robotic system in a further embodiment. With reference the robotic system 200 of FIG. 2, the controller 220 may first enable an offline "training mode," for example by a user selection communicated to the controller 220 (705). The controller 220 enables backdriven movement of the robotic arms 210A-B (710). Then, during a demonstration of a task and complementary action as performed by an assistant backdriving the robotic arms 210A-B, the controller 220 simultaneously records both representations of the backdriven movement (720) and records representations of the motion(s) of the wearer as indicated by the sensors 240A-C(725). Based on an analysis of this recorded data (e.g., PLS regression analysis), prediction information and movement instructions may be generated, which indicate a given robotic action corresponding to an anticipated task to be performed by the wearer as indicated by the wearer's motion(s) (740). This prediction information and movement instructions may be applied to update a database (e.g., data store 280) for reference during "online" operation of the robotic system 200.

Figure 8:
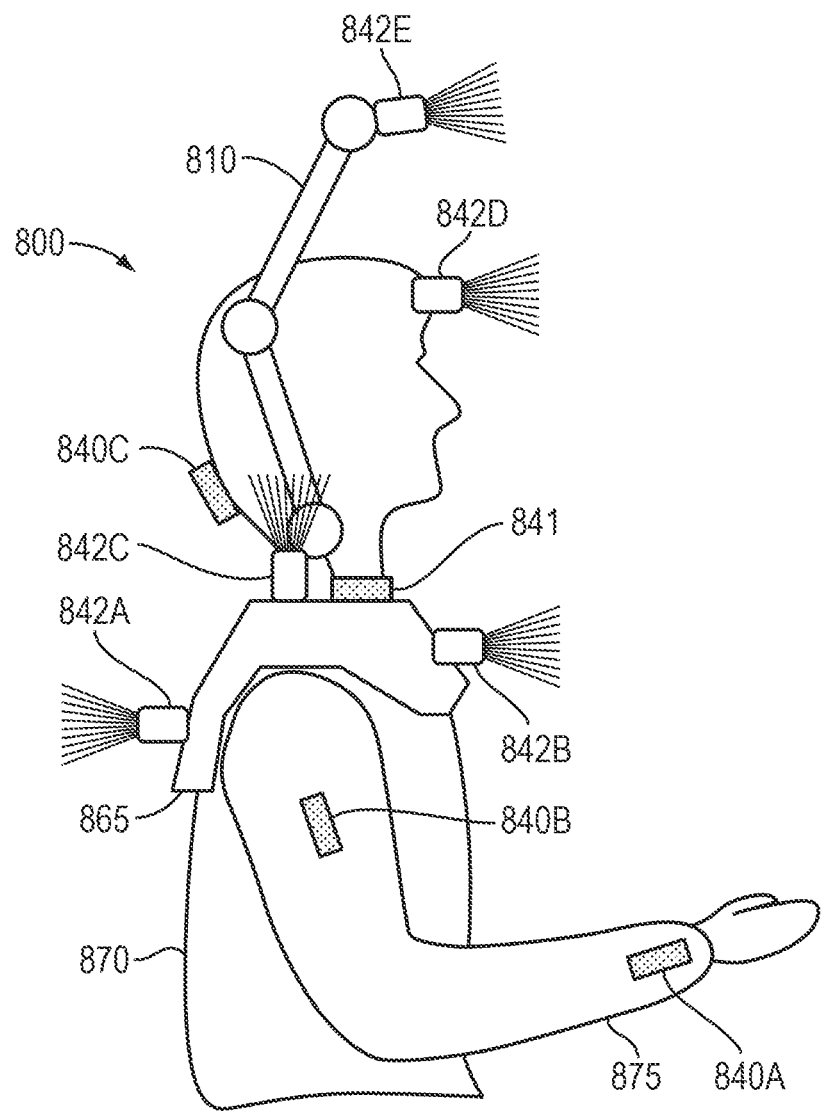
FIG. 8 is a schematic of a robotic system, including an array of sensors, in a further embodiment.

FIG. 8 is a schematic diagram of a robotic system 800 in a further embodiment. The system 800 may incorporate features of the robotic systems 100, 200, 400, 600 described above with reference to FIGS. 1-7. The system 800 further includes an array of sensors 840A-C, 841, 842A-E to monitor state(s) (e.g., position, movement, or combination thereof) of the wearer 870 and positioning of the robotic arm 810. Such sensors may include inertial measurement units (IMUs) that employ of accelerometers and gyroscopes for measuring motion and estimating position, and may further include optical sensors such as cameras, range sensors, and proximity sensors. In particular, a wrist-mounted IMU 840A and upper-arm-mounted IMU 840B are configured to sense motion(s) of the wearer's arm 875, while a head-mounted IMU 840C senses motion(s) of the wearer's head. An additional IMU 841 may be mounted to the top portion of the harness 865 to detect the inclination of the wearer 870 (e.g., a measure of the wearer's tilt away from an upright or vertical standing posture).

Further, front and back cameras 842A-B may be mounted to the harness 865 to capture images opposite of the wearer 870, a shoulder camera 842C may capture images of the wearer's head, and a head-mounted camera 842D may capture images opposite of the wearer 870. Further, a robot-mounted camera 842E may be mounted to an end of the robotic arm 810 to capture images opposite of the robotic arm 810. The image data from the cameras 842A-E may be processed (e.g., by a controller) to indicate motion(s) of the wearer 870 and the robotic arm 810.

Figure 9B:
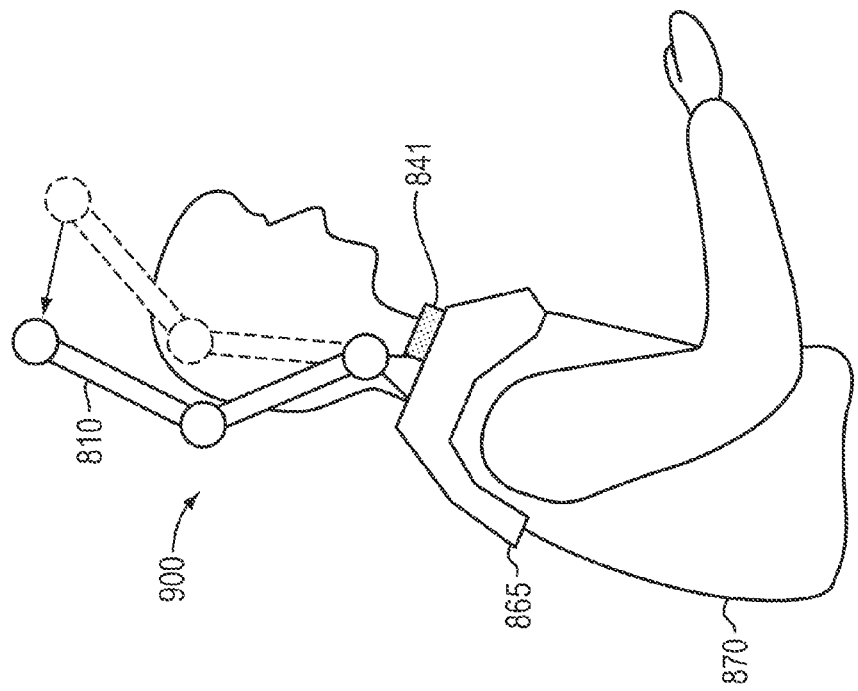
FIGS. 9A-B illustrate a robotic system performing compensation for a wearer's orientation in one embodiment.
Figure 9A:
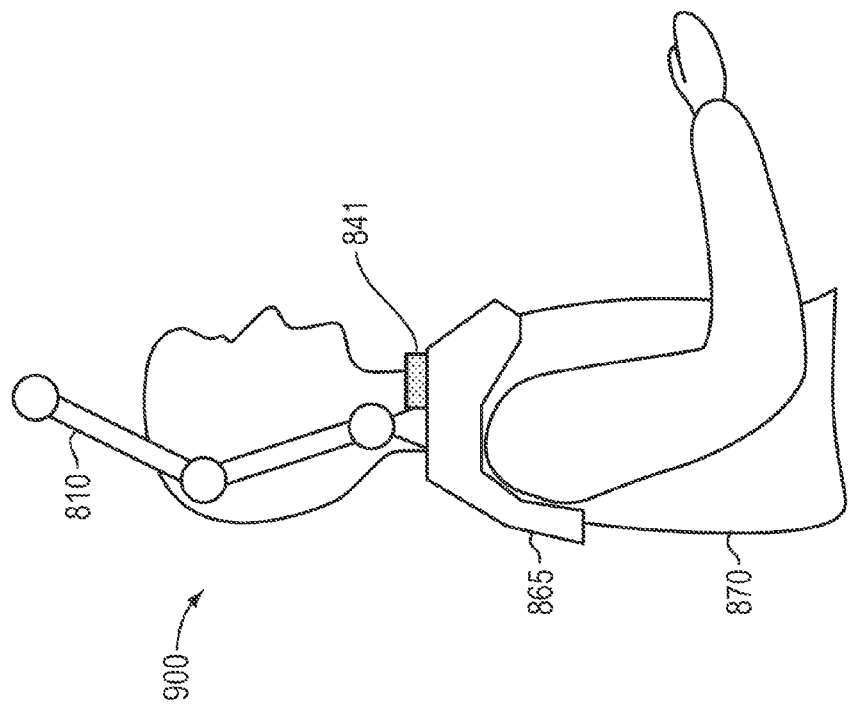

FIGS. 9A-B illustrate a robotic system 900 configured to perform compensation for a wearer's orientation. The robotic system 900 may incorporate features of the system 800 described above with reference to FIG. 8, with particular attention to the IMU 841. The IMU 841 may operate to detect the inclination of the wearer 870, particularly the degree of the wearer's deviation from an upright or vertical standing posture. As shown in FIG. 9A, the wearer 870 exhibits an upright, vertical posture. A controller, sensing this inclination via the IMU sensor 841, controls the robotic arm 810 to position itself in a balanced position relative to the wearer 870 (e.g., above the wearer's estimated center of gravity). As shown in FIG. 9B, the wearer 870 leans forward, shifting his or her inclination away from the vertical and upright position. The IMU 841 detects such a shift, and the robotic system, in response to the shift, moves the robotic arm 810 to a position more favorable to the wearer 870 (e.g., toward a position above the wearer's center of gravity). The robotic system 900 may implement such an adjustment, responsive to the wearer's inclination, during a standby mode of operation or in conjunction with a robotic action complementary to a task being performed by the wearer 870. As a result, the robotic system 900 can manipulate the robotic arm 810 based on the wearer's inclination in order to maintain the robotic arm 810 in a position that is balanced and ergonomic relative to the wearer 870.

Figure 10:
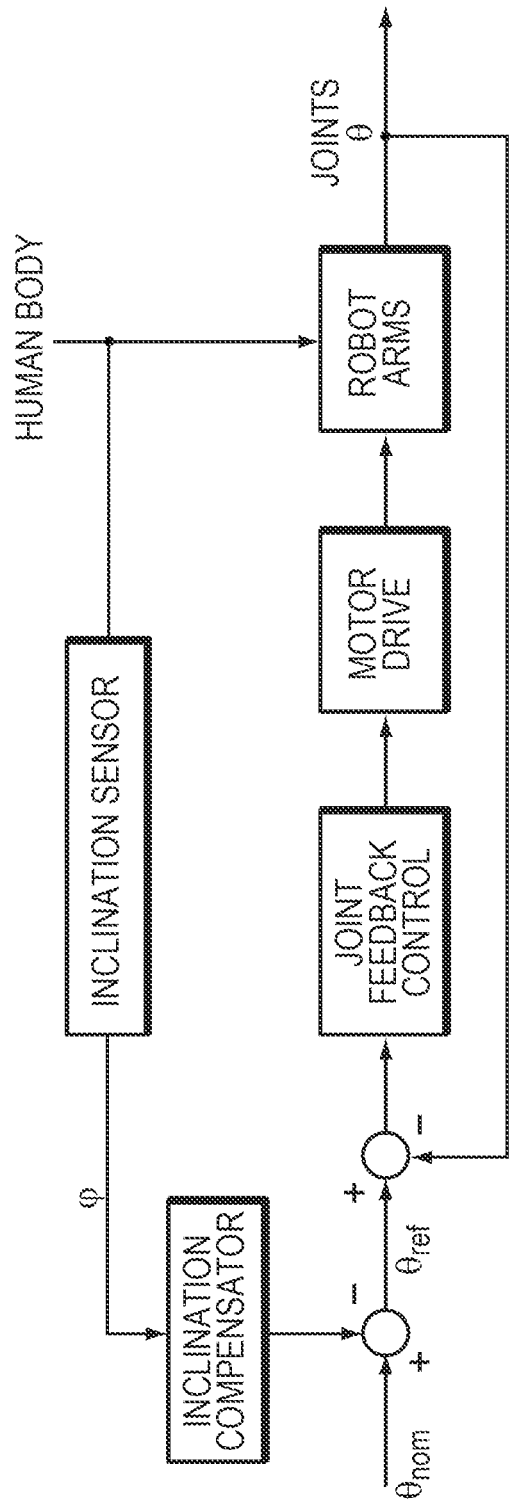
FIG. 10 is a block diagram of a feedback control loop for controlling a wearable robotic system described herein in a manner that compensates for disturbances caused by inclination of the wearer.

FIG. 10 is a block diagram of a closed-loop control system 1000 that accommodates large pertubations, such as a wearer's body change in inclination, which may be applied to the robotic system 900 described above with reference to FIGS. 9A-B. The system 1000 may be operated, for example, by a controller (e.g., controllers 120, 220 described above) communicatively coupled to the robotic arm(s) (e.g., arm 810) and sensors measuring the wearer's inclination (e.g., IMU 841). Based on a signal representing the wearer's inclination or change in inclination, the controller may output an inclination compensation signal, which is incorporated into a feedback process for controlling the joints of the robotic arm(s) 810. As a result, the output signal(s) θ to control the robotic arm(s) 810 direct the robotic arm(s) 810 to move in a manner that compensates for the wearer's inclination or change in inclination.

Example embodiments of the invention may implement coloured Petri nets (CPNs) to model the robotic arms and the wearer's arms as a single system. In the example application of the ceiling panel installation (described above with reference to FIGS. 1-5), a pair of robotic limbs supporting the panel and wearer's arms can be modeled using a CPN model. The following discrete static states, termed places P, and dynamic state paths, termed transitions T, may be defined as follows:

P={Standby, SRL holds panel in position, Screw in Position, PSD in position, Fastened Screws}

T={Prepare screw and PSD, Fastened screw}

The places or transitions occurring on the system are controlled by tokens, which represent the availability of resources. In the human-robot system, multiple types of resources, e.g., human arms vs. SRLs, must be distinguished. CPN is used to employ colour tokens containing diverse information that allows one to identify them and assign them their roles accordingly. The colours, or properties for the system's tokens, used for the CPN model may be:

Σ={No, Re, NoxRe, status, TR}, where the colours No, Re, NoxRe, status and TR are integer, string, product of integer and string, Boolean, and a list of integer and strings products, respectively. These colours serve as labels that are used to distinguish each token and allow us to group and use them as we want. Using state space analysis for the CPN model, there may be only one possible end state (i.e., a completed task), but various manners of achieving it.

Example embodiments of the invention may further implement a partial least squares (PLS) regression analysis as an element to predict a wearer's anticipated movements and tasks, and to direct one or more robotic arms to perform an action complementary to the tasks. A description of PLS-based analysis and its application to example embodiments is described below.

In accomplishing a manual overhead task, such as a ceiling panel installation as described above, a human assistant executes the ceiling panel installation task in a more dynamic and efficient manner than the step-by-step discrete transitions depicted by the standard CPN model. Each worker observes the co-worker's action and makes a proactive, or even preemptive, action based on a prediction of the worker's movements. This prediction-based, proactive/preemptive transition can be generated by combining the CPN model with demonstration or "training" data.

Human skill acquisition is an effective method for extracting human skills from teaching-by-showing data. Coordinated actions of two co-workers can be observer, and dynamic predictors for triggering transitions that are made in a proactive/preemptive manner can be extracted. The identified dynamic predictors may be embedded in the CPN model and used for controlling supernumerary robotic limbs (SRLs) in real-time.

A challenge in applying human skill acquisition is the difficulty in finding the right "structure" of skill model to predict the observed behavior. It may not be clear which signals and what sort of traits the human uses in performing actions complementary to another worker. To ease this fundamental difficulty, a multivariate data analysis technique may be employed, referred to as partial least squares (PLS) regression. PLS is an extension of principal component analysis to input-output data, where most significant latent variables are determined to maximize the correlation for predicting outputs. A PLSR algorithm can be used to find a relationship between the sensors worn by the human worker and the preemptive action taken by his or her coworker.

First, a number of signals may be observed from human demonstrations, and a high-dimensional input space is formed by aggregating the data over a certain time window. Human demonstration may take place at a test rig that resembles a ceiling structure (as described above with reference to FIG. 6). During these tests, the wearer picks up a ceiling panel, each time from a different location, and proceeds to position the panel with the correct orientation against the test rig. During this time, the assistant manually operates the SRL in order to help the main worker position and hold the panel. The goal of this assistant is to minimize the amount of time that the main worker has to hold the panel. With that in mind, for this experiment, the assistant may not assume leadership and cannot interfere directly with the main worker's workspace. The wearer may also wear three inertial measurement units (IMUs), for example. Each IMU records gyro and accelerometer information. In this example, the IMUs are worn in two different locations: one is worn in each wrist and one at the base of the robot's shoulder mount. This last IMU ensures that the overall orientation and motion of the robot's base (affected by human motion) is taken into account for the prediction. In its simplest form, the input data space recorded at any time t contains the gyro and accelerometer data from three IMU's. This accounts for eighteen (18) data points. However, given the spacial-temporal aspect of the task, the PLSR operations may be applied to make predictions based on time-series data.

The output space is formed by observed data of the assistant's movements, which can be used for controlling the SRL.

In these tests, the assistant's actions can be presented as all the joint angles for the robot; therefore, the output matrix at any time t consists of 10 readings corresponding to the 5 joints of both robot arms. The PLS data analysis may be used to find the most significant factors of both data groups and identify which factors from the input data can describe best the output.

Taking into consideration all data recorded at time t, the input and output matrices used for the PLSR predictions may be built. In one example, test data may be collected through several (e.g., 25) different training sessions under different conditions. A number of training sessions (also referred to as "trials") may be used for data validation. From each trial, a number of data points may be evaluated, corresponding to the number of samples during the slowest task completion among the trials.

Using data recovered at time t, the following may be built:

$$x(t)=(x_1(t),x_2(t),\ldots,x_{18}(t)) \quad (1)$$

$$y(t)=(\theta_1(t),\theta_2(t),\ldots,\theta_{10}(t)) \quad (2)$$

Storing data from time t−19 up to t, the following matrices may be built:

$$X_n(t)=[x(t-19),x(t-18),\ldots,x(t)] \quad (3)$$

$$Y_n(t)=y(t) \quad (4)$$

where n=t and goes from 1 to 160 correspond to the respective time sample in the trial data point. Note that for point n=1 from the trial data, (3) includes up to the x(t−19)th term. In order to include such data in the analysis, the test subject may be prohibited from starting to perform the task until a period of 5 seconds, for example, has passed. During this time the test subjects are free to do as they will as long as the helping worker maintains the SRL's arms at the rest position. This allows a variety of initial conditions for the evaluated data sets. The output matrix (4) is straightforward to build as it only contains the joint angles at time t. Taking into account M=20 training data sets, and J=5 configurations of test subjects, the X and Y matrices can be built for use for the PLSR operations:

$$XX_m = \begin{bmatrix} X_1(t) \\ \vdots \\ X_N(t) \end{bmatrix}, XXX_j = \begin{bmatrix} XX_1(t) \\ \vdots \\ XX_M(t) \end{bmatrix}, X = \begin{bmatrix} XXX_1(t) \\ \vdots \\ XXX_J(t) \end{bmatrix} \quad (5)$$

$$YY_m = \begin{bmatrix} Y_1(t) \\ \vdots \\ Y_N(t) \end{bmatrix}, YYY_j = \begin{bmatrix} YY_1(t) \\ \vdots \\ YY_M(t) \end{bmatrix}, Y = \begin{bmatrix} YYY_1(t) \\ \vdots \\ YYY_J(t) \end{bmatrix} \quad (6)$$

Before implementing the PLSR operations, both X and Y may be column normalized. In order to mimic using the PLSR for real-time predictions, the validating data sets may be normalized using the averages and standard deviation from the training data sets. Using the normalized matrices as input and output matrices, respectively, for the PLSR operations allows the robotic system to calculate the actions that the robot must make at time t in order to help its wearer in a proactive and preemptive manner. By predicting the joint angles for the SRL at each instant in time, adaptive or sliding control may be employed to ensure that the SRL follows a predicted trajectory.

Using traditional transitions and places may not allow the robot to act preemptively. However, in order to employ the PLSR operations to perform highly coordinated and concurrent actions, various transitions and places can be combined into a single, broader transition: a "super transition." In this case, the super transition absorbs transitions a and b, as well as place. The resulting super transition may then utilize the PLSR operations to control the robot.

Figure 11:
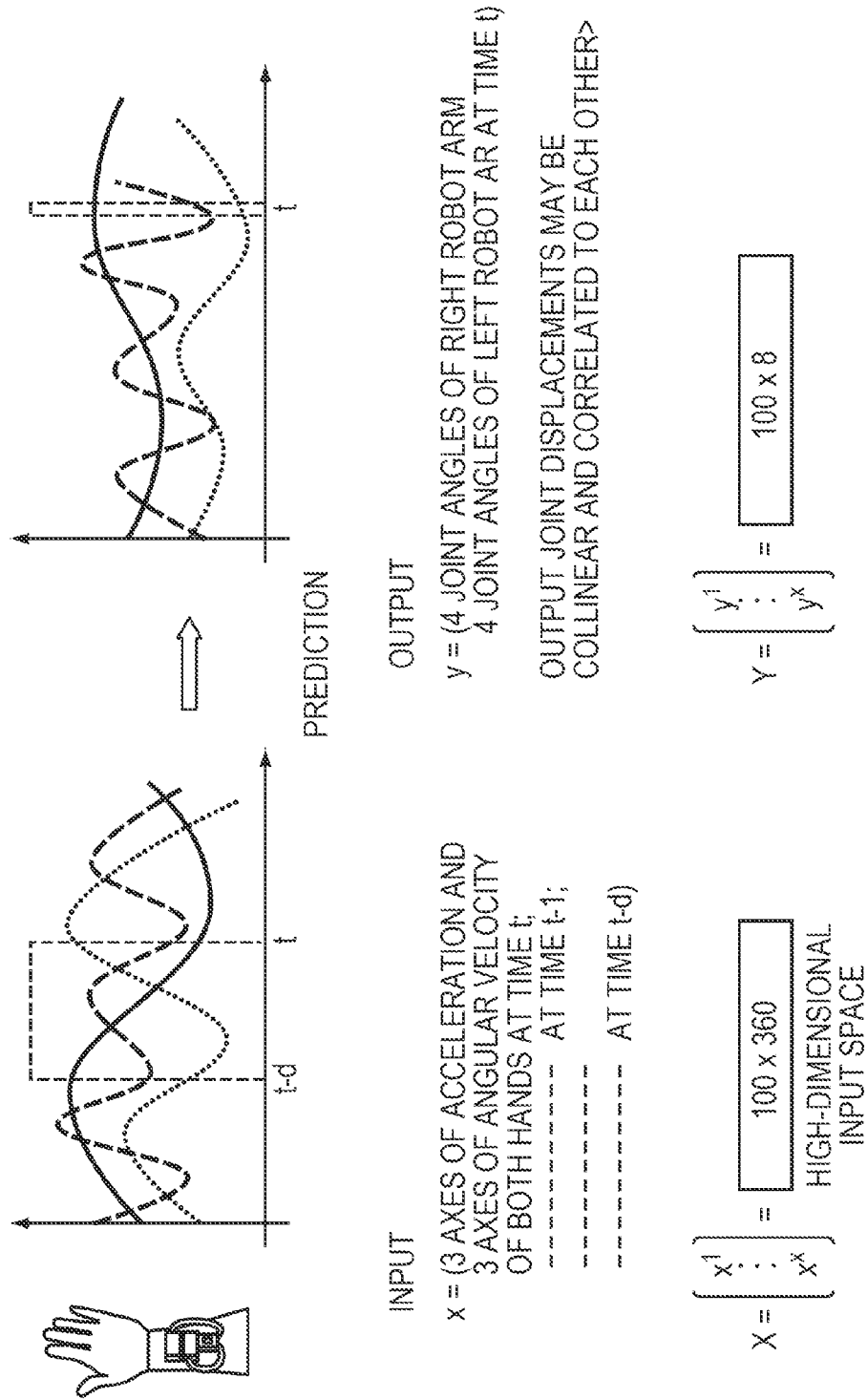
FIG. 11 illustrates a process of predicting a wearer's motion and determining a complementary action in one embodiment.

FIG. 11 illustrates a process of predicting a wearer's motion and determining a complementary action as a result of PLS regression analysis in one embodiment. Input data (e.g., from a training session as described above with reference to FIGS. 6-7) may be stored to a data store (e.g., data store 280 described above) for analysis. The stored data are split into an input data matrix X, which includes data of the wearer's motion and the task state, and an output data matrix Y, which includes data of the robot motion.

$$X = \begin{bmatrix} x^1 \\ \vdots \\ x^N \end{bmatrix} \in \mathcal{R}^{N \times n}, Y = \begin{bmatrix} y^1 \\ \vdots \\ y^N \end{bmatrix} \in \mathcal{R}^{N \times m} \quad (1)$$

where $x^i=[x_1^i,\ldots,x_n^i]$ is the i-th sample of the Wearer's motion and the task state measured during the period of time t−k and time t, and $y^i=[y_1^i,\ldots,y_m^i]$ the Assistant's motion at time t. FIG. 6 illustrates the input-output data matrices. Note that the dimension of the input data matrix is very high. The covariance of such a high-dimensional dataset can be approximated with a few principal components. Expanding on the Principal Component analysis, Principal Component Regression (PCR) can be used for predicting the joint angles of the robot (y) from those of the input vector containing the wearer's motion and the task state (x). Approximating the input matrix X to the first k principal components, one can regress the output on the k principal components as covariates. Using ordinary least squares regression, a regression coefficient matrix $B_k$ can be found such that $$\hat{y}=xB_k, \quad (2)$$

where $\hat{y}$ is the prediction of output y.

Note, however, that PCR takes into account only the variances of the input data. In consequence, it may not be sufficient for predicting the output in situations where a minor component of X is highly correlated with Y. A multivariate regression method, called Partial Least Squares Regression (PLSR), is used to maximally correlate input and output vectors. PLSR regresses the output vector on a set of Latent Variables (LVs) in the input space that have the most significant correlation with the output. The LVs are obtained by iteratively performing Singular Value Decomposition (SVD) on the matrix $\tilde{X}^T\tilde{Y}$, where $\tilde{x}$ and $\tilde{y}$ are deflated input and output data matrices with the original data matrices, X and Y, as initial values. Projecting the most significant left singular vector, w, onto $\tilde{X}$, the first Latent variable can be obtained:

$$t=\tilde{X}w \quad (3)$$

The resulting LV is then normalized to calculate its corresponding loading, p and q, in the input and output spaces, respectively.

$$p=\tilde{X}^T\tilde{t} \quad (4)$$

$$q=\tilde{Y}^T\tilde{t} \quad (5)$$

A similar LV for the output space can also be found using the first right singular vector. To continue the iterative process, $\tilde{x}$ and $\tilde{Y}$ are deflated by subtracting the information accounted for by the LV, and SVD is performed on the cross product of the new $\tilde{X}$ and $\tilde{Y}$.

$$\tilde{X}=\tilde{X}-\tilde{t}p^T \quad (6)$$

$$\tilde{Y}=\tilde{Y}-\tilde{t}q^T \quad (7)$$

Since PLSR is an extension of PCR, regression (2) can be used to approximate the output matrix with the input matrix. In this case, the regression coefficient matrix $B_k$ based on the first k LVs becomes $$B_k = W_k(P_k^T W_k)^{-1}(T_k^T T_k)^{-1} T_k^T Y \qquad (8)$$

where $T_k$, $W_k$, and $P_k$ are matrices that contain a series of column vectors $\bar{t}$, w, and p, respectively, from the first k iterations of the above process.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should also be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A robotic system, comprising:
    a robotic arm configured to be mounted to a wearer proximate to a shoulder of the wearer;
    a sensor configured to sense motion of the wearer's upper body and at least one of the wearer's arms; and
    a controller configured to detect a task being performed by the wearer based on the motion and to cause the robotic arm to perform an action independent of the motion and complementary to the task.

2. The system of claim 1, wherein the robotic arm is mounted above the wearer's shoulders.

3. The system of claim 1, wherein the controller is further configured to cause the robotic arm to compensate for the motion as a function of at least one maximum correlation variable between the robotic arm and the motion.

4. The system of claim 1, wherein the controller is further configured to perform the action based on prediction information, the prediction information indicating a movement instruction for the robotic arm corresponding to the task.

5. The system of claim 4, wherein the controller is further configured to update the prediction information to a database based on backdriven movement of the robotic arm.

6. The system of claim 4, wherein the controller is further configured to generate the prediction information based on recorded movement of the robotic arm and recorded motion of the wearer's upper body and the wearer's arm.

7. The system of claim 6, wherein the recorded movement is caused by a user other than the wearer.

8. The system of claim 6, wherein the controller is further configured to selectively enable the robotic arm to be backdriven and to record the backdriven movement based on a user selection of a mode of operation.

9. The system of claim 1, wherein the robotic arm further comprises a sensor at an end of the robotic arm, the controller causing the robotic arm to position itself based on a feedback signal from the sensor.

10. The system of claim 9, wherein the controller is further configured to cause the robotic arm to implement at least one of a given position and a given force based on the feedback signal from the sensor.

11. The system of claim 1, wherein the controller is further configured to determine a movement of the robotic arm based on a partial least squares regression that relates the action to the motion and the task.

12. The system of claim 1, wherein the robotic arm is a first robotic arm, and further comprising a second robotic arm mounted to the wearer, the controller configured to cause the second robotic arm to perform an action independent of the motion and complementary to the task.

13. The system of claim 12, further comprising a mount supporting the first and second robotic arms above the wearer's shoulders.

14. The system of claim 1, wherein the sensor include sensors mounted to at least one of the wearer's upper body and the wearer's arm.

15. The system of claim 1, wherein the sensor is further configured to image the wearer's upper body and at least one arm.

16. The system of claim 1, wherein the action includes a sequence of movements of the robotic arm.

17. The system of claim 1, wherein the sensor is further configured to detect position with regard to the wearer's upper body and at least one arm.

18. The system of claim 1, wherein the controller is further configured to perform the action based on a robot motion predicted based on of the wearer's motion and the task.

19. A method of operating a robotic system, comprising:
    enabling a robotic arm to be backdriven by a user, the robotic arm being mounted to a wearer distinct from the user;
    recording representations of backdriven movement of the robotic arm by the user;
    recording representations of movement of the wearer concurrently with the representations of the backdriven movement; and
    generating a movement instruction for the robotic arm based on the recorded backdriven movement and recorded movement of the wearer.

20. The method of claim 19, further comprising controlling movement of the robotic arm based on the movement instruction and a detected movement of the wearer.

21. The method of claim 19, further comprising recording representations of a task status.

22. The method of claim 21, wherein generating the movement instruction is based on the task status.

23. A method of operating a robotic system, comprising:
    sensing motion of a wearer's upper body and at least one of the wearer's arms, the wearer wearing a robotic arm proximate to the shoulder of the wearer;
    detecting a task being performed by the wearer based on the motion; and
    causing the robotic arm to perform an action independent of the motion and complementary to the task.

24. A non-transitory computer-readable medium including instruction that, when executed by a computing device, cause the computing device to:
- sense motion of a wearer's upper body and at least one of the wearer's arms, the wearer wearing a robotic arm proximate to the shoulder of the wearer;
- detect a task being performed by the wearer based on the motion; and
- cause the robotic arm to perform an action independent of the motion and complementary to the task.

* * * * *